United States Patent

Schneider

[15] 3,679,758
[45] July 25, 1972

[54] DIHALOGENATION OF BRANCHED ALKANES

[72] Inventor: Abraham Schneider, Overbrook Hills, Pa.
[73] Assignee: Sun Oil Company, Philadelphia, Pa.
[22] Filed: Dec. 9, 1969
[21] Appl. No.: 883,580

Related U.S. Application Data

[63] Continuation-in-part of Ser. No. 702,789, Feb. 5, 1968, Pat. No. 3,485,880.

[52] U.S. Cl. ........................................................260/659 R
[51] Int. Cl. ....................................................C07c 17/10
[58] Field of Search ..................................260/659 R, 658 R

[56] References Cited

UNITED STATES PATENTS 3,230,269  1/1966  Mahan et al. ..................260/648 R X
3,485,880  12/1969  Schneider .........................260/648 R

*Primary Examiner*—Leon Zitver
*Assistant Examiner*—Joseph A. Boska
*Attorney*—George L. Church, Donald R. Johnson and Wilmer E. McCorquodale, Jr.

[57] ABSTRACT

Singly and doubly branched alkanes of the $C_7$–$C_{30}$ range having a chain of at least 6 carbon atoms and 1-2 alkyl substituents of 1-3 carbon atoms each are dichlorinated or dibrominated by reacting the same under homogeneous conditions and at $-30°$ C. to $20°$ C. with a $C_4$–$C_5$ tertiary alkyl chloride or bromide, using as catalyst dissolved $AlCl_3$ or $AlBr_3$, and then recovering a dichloro or dibromo alkane product. The products have utility as intermediates for preparing difunctional derivatives, e.g. diacids, dialcohols or diamides, which are useful as monomers in polymer manufacture.

23 Claims, No Drawings

DIHALOGENATION OF BRANCHED ALKANES

CROSS REFERENCE TO RELATED APPLICATION

This application is a continuation-in-part of my copending U.S. application Ser. No. 702,789, filed Feb. 5, 1968, now U.S. Pat. No. 3,485,880, issued Dec. 23, 1969, which discloses and claims a process for polychlorinating or polybrominating $C_{10}$-$C_{20}$ adamantane hydrocarbons at bridgehead positions in the adamantane nucleus. The procedure involves reaction of the feed hydrocarbon under homogeneous conditions with a $C_4$-$C_5$ tertiary alkyl chloride or bromide, using as catalyst dissolved $AlCl_3$ or $AlBr_3$. The present process utilizes a similar procedure for dihalogenating branched alkanes. Halogenations of other types of hydrocarbons by a similar procedure are described and claimed in my copending application Ser. No. 883,579, filed Dec. 9, 1969.

BACKGROUND OF THE INVENTION

This invention relates to the conversion of singly or doubly branched alkanes having seven or more carbon atoms into dihalogenated derivatives in which the halogen is chlorine or bromine. The halogenating agent is a $C_4$-$C_5$ tertiary alkyl chloride or bromide. The products are dichloro or dibromo alkanes having the same number of carbon atoms as the starting material. They have utility as intermediates for preparing difunctional derivatives, e.g. diacids, dialcohols or diamides, which are useful as monomers in polymer manufacture.

Hydrogen-halogen exchange reactions between a tertiary alkyl halide, such as t-butyl chloride, and various hydrocarbons containing one or more tertiary hydrogen atoms have been described in the prior art. A process involving this reaction has been described, for example, by C. W. Kruse, Preprints, ACS Pet. Div., Vol. 12, No. 2, Advances in Petrochemical Symposium, Miami Beach, Florida (April, 1967). In the described process an aluminum chloride complex was used for effecting the reaction, which was conducted at room temperature to produce 2-chloro-2,3-dimethylbutane from the corresponding hydrocarbon by hydrogen-halogen exchange with t-butyl chloride. The reaction system was heterogeneous and no dichloride product was formed.

Other hydrogen-halogen exchange reactions between tertiary butyl chloride and various hydrocarbons using aluminum trichloride as catalyst have been described in the following U.S. Pats.:

| Patentee | Patent No. | Issue Date |
|---|---|---|
| Schmerling | 2,448,156 | Aug. 31, 1948 |
| Condon | 2,629,748 | Feb. 24, 1953 |
| Condon | 2,646,453 | July 21, 1953 |
| Schneider et al. | 2,742,507 | Apr. 17, 1956 |
| Gerzon | 3,096,372 | July 2, 1963 |
| Mahan et al. | 3,230,269 | Jan. 18, 1966 |
| Kruse et al. | 3,247,277 | Apr. 19, 1966 |

The reaction conditions taught in these references generally are such that the reaction system is heterogeneous, comprising a hydrocarbon phase and a catalyst phase. None of these references teaches the preparation of dihaloalkanes by means of a hydrogen-halogen interchange reaction.

Netherlands Pat. application No. 68/11,957, filed Aug. 22, 1968, by British Hydrocarbon Chemicals Ltd. discloses a process for converting dimethylhexenes to the compound, 2,5-dichloro-2,5-dimethylhexane. This involves hydrochlorination of the dimethylhexenes to form octyl monochlorides, disproportionation of the latter by means of $AlCl_3$ under non-homogeneous conditions and crystallizing 2,5-dichloro-2,5-dimethylhexane from the reaction product.

SUMMARY OF THE INVENTION

The present invention provides a process for utilizing the hydrogen-halogen interchange reaction to convert certain types of alkanes into dihalo derivatives. The starting alkanes are those of the $C_7$-$C_{30}$ range which have the following characteristics: (1) a chain of at least six carbon atoms which does not contain a quaternary carbon atom; and (2) one or two alkyl substituents which are methyl, ethyl or n-propyl or any combination thereof. The procedure involves a hydrogen-halogen interchange reaction between one or more of such alkanes and a $C_4$-$C_5$ tertiary alkyl chloride or bromide, promoted by means of $AlCl_3$ or $AlBr_3$ in solution. The reaction is carried out at a relatively low temperature, viz. in the range of $-30°$ C. to $20°$ C., and conditions are such that a homogeneous reaction mixture is maintained.

I have now found that in order to dihalogenate the starting alkane effectively it is essential that a substantially homogeneous reaction system be maintained with the aluminum trihalide catalyst in solution in the reactant mixture.

The process of the invention comprises the following steps:

a. forming a solution of (1) a $C_7$-$C_{30}$ branched alkane having a chain of at least six carbon atoms which does not contain a quaternary carbon atom and having 1-2 unbranched alkyl substituents containing 1-3 carbon atoms each, and (2) a $C_4$-$C_5$ tertiary alkyl halide in which the halogen is chlorine or bromine in molar ratio to said alkane of at least 2:1, said solution being capable of dissolving and maintaining therein the aluminum trihalide hereinafter specified;

b. maintaining said solution at a temperature in the range of $-30°$ C. to $20°$ C. while admixing therewith and dissolving therein an aluminum trihalide in which the halogen is the same as that in the tertiary halide, the weight ratio of aluminum trihalide to the tertiary halide being sufficient to promote dihalogenation of said alkane;

c. maintaining the resulting solution within said temperature range and in homogeneous phase until at least substantial dihalogenation of the alkane has occurred;

d. and recovering from the reaction mixture a dihalogenated alkane product.

DESCRIPTION

As a specific illustration of the process, 10 parts (by weight) of 3,7-diethylnonane are dissolved in 100 parts of tertiary butyl bromide, the solution is cooled to $-5°$ C. and three parts of $AlBr_3$ are mixed into and dissolved in the solution. The mixture is stirred at $-5°$ C. for 30 minutes, during which time isobutane is formed and partly evolves. The mixture remains essentially homogeneous, no separate catalyst complex phase being formed. The mixture is then washed with water to remove the inorganic material and fractionally distilled. The main products obtained are 3,7-dibromo-3,7-diethylnonane and the corresponding monobrominated compound, 3-bromo-3,7-diethylnonane. Minor amounts of other bromine-containing products are also produced.

As a further specific illustration, 10 parts of 2-methyl-hexane are dissolved in a mixture of 40 parts of t-butyl chloride and 40 parts of methylene chloride, the solution is agitated at about $0°$ C., 1 part of $AlCl_3$ powder is dissolved therein and mixing is continued for 30 minutes. Then $AlCl_3$ is again added in the same amount as before and mixing at $0°$ C. is continued for a further period of 30 minutes. All of the catalyst goes into and remains in solution during the reaction. Water washing followed by fractional distillation of the reaction mixture yields a methylhexyl dichloride fraction as one of the two main products, the other being a methylhexyl chloride fraction. In this illustration the methylene chloride does not enter into the reaction, serving merely as an inert solvent.

The halogenating agent for practicing the invention must be a $C_4$ or $C_5$ tertiary alkyl chloride or bromide or, in other words, t-butyl or t-amyl chloride or bromide. Primary or secondary halides are not suitable, for these will not react in the manner desired. Also it is essential for purposes of the present invention that a low reaction temperature, i.e., in the range of $-30°$ C. to $20°$ C., be used, since at higher temperatures cracking reactions will occur causing sludge to precipitate and the desired dihalo derivatives will not be produced in substantial amounts. Preferably a reaction temperature in the range of $-10°$ C. to $10°$ C. is employed.

It is also important in the present process that the reaction mixture comprising the $C_7$-$C_{30}$ branched alkane and the $C_4$-$C_5$ tertiary alkyl halide be capable of dissolving and maintaining in solution therein all of the $AlCl_3$ or $AlBr_3$ added. In other words, conditions must be such as to maintain substantially the entire reaction mixture as a single phase and avoid the formation of a separate catalyst complex phase. The preferred way of establishing and maintaining a homogeneous system is to utilize a considerable excess of the tertiary alkyl halide over the stoichiometric amount required for the desired degree of dihalogenation. When the $AlCl_3$ or $AlBr_3$ is added to the mixture, it reacts with the tertiary alkyl halide to form a complex and this complex must remain at least mainly in solution. The precise function of the complex is not known with certainty and it may be that at least part of it acts as the catalytic species. However, it is considered more probable that dissolved $AlCl_3$ or $AlBr_3$ is the catalytic agent and that, at least in the case of $AlCl_3$, the complex formed is necessary for bringing the $AlCl_3$ into solution. In any event, sufficient excess tertiary alkyl halide should be present to act as solvent for this catalyst complex and keep it in solution. Otherwise, if a homogeneous reaction mixture is not maintained and the catalyst complex forms a separate phase, substantial dihalogenation will not be achieved.

For example, when a dimethylhexane is to be reacted with t-butyl chloride to give the dichloro product, a substantial excess of t-butyl chloride over the stoichiometric 2:1 molar ratio should be used so that the aluminum chloride complex will remain in solution. Typically a molar ratio of t-butyl chloride to dimethylhexane above 3:1, e.g., in the range of 4:1 to 20:1, can be employed to maintain a homogeneous solution. For dichlorination or dibromination of other starting hydrocarbons, analogous ratios of reactants are employed.

Another manner of practicing the invention to maintain homogeneity of the reaction mixture is to employ the $C_4$-$C_5$ tertiary alkyl halide in approximately the stoichiometric amount needed for the hydrogen-halogen interchange reaction, and additionally to use an inert halogenated solvent to keep in solution the complex formed between the tertiary alkyl halide and $AlCl_3$ or $AlBr_3$. Certain halogenated hydrocarbons are inert under conditions used in the process and will not themselves react with the aluminum trihalide to form a complex. These can be used as solvents to maintain the reaction mixture in homogeneous phase. Halogenated hydrocarbons which are suitable for this purpose include the following: methylene chloride; 1,1,2,2-tetrachloroethane; pentachloroethane; and the bromine homologues of each of the foregoing solvents. This manner of practicing the invention is not, however, generally preferred since it requires an additional component in the reaction system, and it is usually preferable merely to use an excess of the $C_4$-$C_5$ tertiary alkyl halide as solvent and thus dispense with the need for an inert halogenated solvent.

The alkane hydrocarbon feed can be one or more branched alkanes of the $C_7$-$C_{30}$ range which has a chain of at least six carbon atoms and either one or two branches. These substituents on the chain can be methyl, ethyl or n-propyl, or any combination of two of these in the case of doubly branched alkanes. When two branches are present, they should be attached to different carbon atoms in the chain, or in other words the starting alkane should not contain a quaternary carbon atom. Any alkanes as here defined can be dichlorinated or dibrominated in the present process to yield dihalo products. In the case of singly branched alkanes one halogen atom in the product will be attached at the carbon atom to which the branch is also attached, while for doubly branched alkanes each halogen atom will be attached to a carbon atom at which one of the alkyl substituents is also located. The alkyl positions along the chain in the product are not necessarily the same as in the starting alkane and often are different, depending upon the particular alkanes employed.

Suitable starting hydrocarbons for the present process can be obtained by isomerization of corresponding n-paraffin hydrocarbons and then separating the singly and doubly branched compounds from the isomerization mixture. This can be done, for example, by means of an aluminum chloride catalyst by the procedure described in Moore et al. U.S. Pat. No. 2,475,358, issued July 5, 1949, which concerns the isomerization of paraffin wax. Another suitable procedure is disclosed in Schneider U.S. application Ser. No. 786,739, filed Dec. 24, 1968, now U.S. Pat. No. 3,523,072, issued Aug. 4, 1970, wherein the isomerization of n-paraffins having 7 to 30 or more carbon atoms per molecule is described. This procedure involves forming a homogeneous mixture of the n-paraffin feed, an inert solvent such as methylene chloride and $AlCl_3$ in the presence of HCl, maintaining the mixture at a temperature of 0°-50° C. to effect isomerization, and then stopping the reaction when only part of the feed has isomerized to avoid cracking. For the present purpose fractions composed, respectively, of singly branched and doubly branched paraffins can be recovered from the reaction products by fractional distillation or fractional crystallization.

The following are some examples of hydrocarbons which are suitable as feed material for the present process. It is to be understood that the specific positions of the alkyl substituents along the chain are not critical and do not affect the operability of the process, as long as the starting hydrocarbon does not contain a quaternary carbon atom.

Singly branched alkanes: 2- or 3-methylhexane; 3-ethylhexane; 2-, 3- or 4-methylheptane; 3- or 4-ethylheptane; 4-propyl-heptane; 2-, 3- or 4-methyloctane; 3- or 4-ethyloctane; 4-propyl-octane; methyl-, ethyl- or propyldecanes; methyl-, ethyl- or propylhexadecanes, eicosanes or pentacosanes; etc.

Doubly branched alkanes: 2,3-, 2,4-, 2,5- or 3,4-dimethylhexane; 2-methyl-3-ethyl- or 2-methyl-4-ethyl- or 3-methyl-4-ethylhexane; dimethylheptanes; 3,4- or 3,5-diethylheptanes; 2-methyl-4-n-propylheptane; dimethylnonanes; methylethylnonanes; diethylnonanes; ethyl-n-propylnonanes; 4,5- or 4,6-di-n-propylnonanes; dimethylcetanes; dimethyloctacosane; and the like.

The following equation illustrates the desired reaction, starting with 2,5-dimethylhexane and t-butyl chloride (most hydrogen atoms being omitted, for convenience):

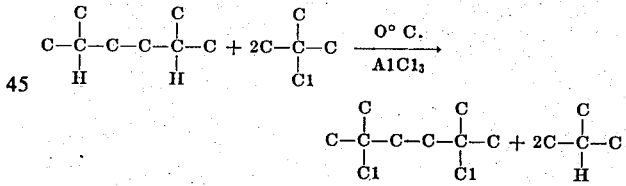

The products of the reaction are 2,5-dichloro-2,5-dimethylhexane and isobutane. In practice other products will also be obtained. A substantial amount of monochlorodimethylhexane usually will be present in the reaction mixture, as well as minor amounts of other monochloro alkanes with a different number of carbon atoms per molecule than the starting alkanes. These minor monochloro products come about as a result of side reactions involving alkylation and disproportionation in combination with the hydrogen-halogen interchange reaction.

In the foregoing equation the positions of the methyl groups in the product are the same as in the starting alkane, but this would not necessarily be the case for other doubly branched alkanes. The 2,5- spacing for a six carbon atom chain is favored as also is a 2,6- spacing for a chain of seven carbon atoms, and these spacings of alkyl groups aid in effecting dihalogenation through anchimeric assistance [see Winstein et al., JACS, 75, 147 (1953)]. However, if the alkyl substituents are originally positioned with closer spacing, monohalogenation will occur at one of the tertiary positions; but before substantial dihalogenation occurs, movement of one or more alkyl groups along the chain takes place until 2-3 carbon atoms are between the two substituted carbon atoms. At this stage dihalogenation can readily proceed due to anchimeric effects. If the reaction is stopped soon after substantial dihalogenation has been effected, the main dihalo product will have the two halogen atoms attached to chain carbon atoms that are separated by 2-3 carbon atoms and that also are substituted by the two alkyl groups. However, if the chain is longer than six carbon atoms and if an alkyl substituent and its accompanying halogen atom are located more inwardly on the chain than a penultimate position, then continuing the reaction will tend to cause both the alkyl and halogen radicals to migrate to the penultimate position. In other words, if enough reaction time is permitted to approach equilibrium conditions, the favored dihalo reaction product from a doubly branched alkane will be the isomer in which the alkyl groups and accompanying halogen atoms are located on the next to last carbon atoms at opposite ends of the chain. For example, if the starting alkane is 4,5-dimethyloctane and enough reaction time is allowed, the favored dihalo reaction product would be 2,7-dihalo-2,7-dimethyloctane. Likewise, from 2,3-dimethyldecane, the favored final dihalo isomer would be 2,9-dihalo-2,9dimethyldecane.

When the starting alkane is singly branched, monohalogenation readily occurs at the tertiary carbon atom but the formation of dihalogenated product takes place much more slowly than in the case of the doubly branched alkanes. This evidently is because of the absence of the other alkyl substituent and a slower anchimeric assistance effect. Nevertheless, it has now been found that substantial dihalogenation of the alkane chain can be achieved under the homogeneous reaction conditions maintained in the present process. In contrast, when heterogeneous conditions are established with the catalyst as a separate phase, the hydrogen-halogen exchange reaction will not result in substantial dihalogenation of the alkanes.

The dihalo product obtained from singly branched alkanes has one of the halogen atoms attached to the same carbon as the alkyl substituent, and the other halogen atom can be located at several positions along the chain. In other words this product is usually a mixture of several isomeric dihalo derivatives. The isomers in which the second halogen atom is positioned at the third and fourth carbon atoms from the carbon atom to which the alkyl group is attached are probably the favored kinetic products, but these tend to isomerize to other dihalo isomers under the reaction conditions. Maintaining these compounds under reaction conditions tends to move the alkyl substituent and its accompanying halogen to a penultimate carbon atom of the chain while distributing the other halogen radical along the chain in the manner required for thermodynamic equilibrium.

A preferred way of carrying out the invention utilizing an excess of tertiary alkyl halide as solvent is given in the following description using t-butyl chloride as the tertiary halide and $AlCl_3$ as catalyst. The starting alkane is dissolved in the t-butyl chloride, using, for example, between 5 and 15 moles of t-butyl chloride per mole of the alkane, and the mixture is cooled to 0° C. While the mixture is being well agitated, $AlCl_3$ is added thereto in amount usually between 1.5 and 5 parts by weight per 100 parts of t-butyl chloride. In some cases it may be advantageous to add the $AlCl_3$ in incremental amounts throughout a time of 10–60 minutes in order to more easily control reaction conditions such as temperature and rate of gas evolution. However, if control of the reaction presents no problem, substantially the same results can be obtained by adding all of the required amount of $AlCl_3$ at once.

When an amount of $AlCl_3$ is added, it goes into solution and forms with the t-butyl chloride a complex which remains in solution. As previously mentioned, the complex formed may act as solvent for uncomplexed $AlCl_3$ which, when brought into solution, functions as the catalytic agent. This promotes the hydrogen-chlorine exchange reaction. Also a slow evolution of HCl generally occurs indicating some side reaction, and the catalyst activity concurrently declines until the reaction ceases. Addition of a further amount of $AlCl_3$ will then result in more solubilized catalyst and further promote the hydrogen-chlorine exchange reaction until the catalyst activity again diminishes. The procedure of adding incremental amounts of $AlCl_3$ can be continued to promote the exchange reaction until an optimum degree of dichlorination has been reached. Alternatively, all of the $AlCl_3$ needed can be added at the beginning provided that the reaction does not proceed so fast as to get out of control. Removal of isobutane from the system as it is formed will expedite the hydrogen-halogen exchange reaction.

The amount of $AlCl_3$ or $AlBr_3$ that should be used depends mainly upon the amount of tertiary alkyl halide in the mixture and the reaction temperature selected within the specified range of −30° C. to 10° C. The higher the reaction temperature the greater is the tendency of the $AlCl_3$ or $AlBr_3$ to be consumed in side reactions and the more that will be required. Preferably, the weight proportion of total aluminum trihalide to tertiary alkyl halide should be in excess of 1.5:100 and sufficiently in excess of this ratio to maximize yield of the dihalogenation product without causing an excessive amount of side reactions, such as cracking, to occur. Side reactions can be inhibited by maintaining a pressure to hydrogen chloride in the reaction system, e.g., by maintaining a partial pressure of HCl in the range of 50–100 p.s.i.

When the reaction has been completed, the mixture can be washed with water to remove the catalyst residues and then the dihalogenated product can be separated from the other components in any suitable manner, for example, by fractional crystallization or distillation.

The dibromo or dichloro alkanes produced by the present invention are useful as intermediates for preparing monomers suitable for making known types of polymers such as polyesters or polyamides. For example, the dihaloalkanes can be reacted in the presence of strong sulfuric acid with formic acid, [see Kach et al. Liebig's Annalen der Chemie, 618, (1958), 251-266] to produce corresponding diacids, or with HCN or nitriles [analogous to Ritter reaction, JACS, 70, (1948), 4045–4048] to form corresponding diamides. Dialcohols, also useful as monomers, can be made by esterifying the diacids and hydrogenating the resulting diesters.

The dighalo product, 2,5-dihalo-2,5-dimethylhexane, which can be made from any dimethylhexane by the present invention, is a useful intermediate in the preparation of p-xylene, since it can be dehydrohalogenated to give the diolefin, 2,5-dimethylhexadine-2,4, which can be dehydrocyclized by means of a chromia-alumina catalyst to yield p-xylene.

The following examples are specific illustrations of the invention:

EXAMPLE I

This example illustrates the reaction of 2,5-dimethyl-hexane (herein "2,5-DMH") with t-butyl chloride. A solution of 1.00 g. (0.0088 mole) of 2,5-DMH, 3.29 g. (0.0355 mole) of t-butyl chloride and 4.0 ml. of methylene chloride was stirred at 0° C. and 0.03 g. of $AlCl_3$ powder was added. The molar ratio of t-butyl chloride to 2,5-DMH was about 4.0. The $AlCl_3$ dissolved and a hazy, colorless mixture was obtained. The mixture was stirred at 0° C. for 20 minutes, and a small sample (Cut 1) was taken for analysis and quenched with brine. To the remainder, 0.03 g. of $AlCl_3$ powder again was added and mixing was continued. The color changed immediately to bright yellow and the solution became transparent and free of haze. The mixture was stirred for 20 minutes more at 0° C. and then was hydrolyzed to give another sample (Cut 2) for analysis. The reaction mixture was essentially homogeneous during the entire reaction period. Each of the samples was analyzed by GLC. Results are shown in Table I and are given in weight percent on a t-butyl chloride-free and methylene chloride-free basis.

TABLE I

Reaction of 2,5-Dimethylhexane

|  | Cut 1 | Cut 2 |
|---|---|---|
| Total reaction time, min. | 20 | 40 |
| g. $AlCl_3$/100 g. t-butyl chloride | 0.9 | 1.8 |
| Product Composition, wt. % |  |  |
| $C_5$ monochlorides | 2.0 | 7.7 |
| 2,5-DMH | 19.6 | 11.0 |
| $C_6$ monochlorides | trace | 8.3 |
| $C_7$ monochlorides | trace | 3.6 |
| 2-chloro-2,5-DMH | 58.8 | 37.1 |
| Other octyl chlorides | 3.6 | 6.8 |
| 2,5-dichloro-2,5-DMH | 16.0 | 25.5 |
| Wt. Ratio of 2,5-dichloro-2,5 DMH/$C_8$ monochlorides | 0.26 | 0.58 |

A sample of the effluent 2,5-dichloro-2,5-DMH fraction was found to have a melting point of about 64° C.

Table I shows that the specific $C_8$ dichloro alkane, 2,5-dichloro-2,5-dimethylhexane, can be made in substantial yield from 2,5-dimethylhexane by means of the present process. Table I also shows that, in addition to the 2-chloro-2,5-dimethylhexane which is the precursor to the desired dichloro compounds, minor amounts of other monochlorides of the $C_5$-$C_7$ range were also produced. These come about through side reactions involving alkylation of the starting alkane followed by disproportionation of the alkylation product. These side reactions can be inhibited, if desired, by conducting the reaction under a partial pressure (e.g., 50–100 p.s.i.) of HCl.

EXAMPLE II

This example is included for purpose of comparison and shows the importance of having at least six carbon atoms in the alkane chain if dichloride derivatives are to be obtained. Specifically, a mixture of 1.00 g. of 2,4-dimethylpentane (herein "2,4-DMP"), 3.68 g. of t-butyl chloride and 4.0 ml. of methylene chloride was prepared and cooled to 0° C. $AlCl_3$ powder in an amount of about 0.03 g. was added and the resulting solution was stirred at about 0° C. for 20 minutes. The mixture was then hydrolyzed and analyzed by GLC, giving the results shown in Table II.

TABLE II

Reaction of 2,4-Dimethylpentane

| | |
|---|---|
| Total reaction time, min. | 20 |
| g. $AlCl_3$/100 g. t-butyl chloride | 0.8 |
| Product Composition, wt. %: | |
| 2,4-DMP | 76.9 |
| $C_6$ monochlorides | 0.7 |
| 2-chloro-2,4-DMP | 10.5 |
| $C_7$ monochloride No. 1 | 1.4 |
| $C_7$ monochloride No. 2 | 4.4 |
| $C_7$ monochloride No. 3 | 5.4 |
| $C_7$ monochloride No. 4 | 0.7 |
| Ratio $C_7$ dichloride/$C_7$ monochloride | 0 |

The results of Table II show that only monochloro products were obtained, thus illustrating the fact that the chain in the starting alkane needs to contain more than five carbon atoms in order for dichloride derivatives to be produced.

EXAMPLE III

This example illustrates the dichlorination of another $C_8$ doubly branched alkane, viz. 2,4-dimethylhexane (herein "2,4-DMH"). The procedure was substantially the same as that used in Example I, with the starting mixture being composed of 0.98 g. 2,4-DMH, 3.37 g. of t-butyl chloride and 4.0 ml. of methylene chloride. The reaction temperature again was 0° C., and in the first reaction stage 0.03 g. of $AlCl_3$ was used. The first sample for analysis was taken after 20 minutes reaction time (Cut 1). The reaction was then continued by adding about 0.05 g. more of $AlCl_3$ and stirring the resulting solution for an additional 20 minutes at 0° C., following which a second sample was taken (Cut 2). Results are shown in Table III.

TABLE III

Reaction of 2,4-Dimethylhexane

|  | Cut 1 | Cut 2 |
|---|---|---|
| Total reaction time, min. | 20 | 40 |
| g. $AlCl_3$/100 g. of t-butyl chloride | 0.9 | 2.6 |
| Product Composition, wt. %: |  |  |
| $C_5$ monochlorides | 4.7 | 9.1 |
| 2,4-DMH | 18.1 | 6.7 |
| $C_6$ monochlorides | 6.1 | 11.6 |
| $C_7$ monochlorides | 5.4 | 6.2 |
| 2-chloro-2,5-DMH | 32.4 | 33.8 |
| Other $C_8$ monochlorides | 11.2* | 8.8** |
| $C_9$ monochlorides | 2.0 | 6.9 |
| 2,5-dichloro-2,5-DMH | 13.3 | 16.7 |
| $C_{10+}$ chlorides | 6.8 | 10.2 |
| Ratio of 2,5-dichloro-2,5-DMH/$C_8$ monochlorides | 0.30 | 0.51 |

*First-formed products of exchange reaction with 2,4-DMH.
**Equilibrated octyl chlorides; mainly higher boiling than *.

The data in Table III show that 2,4-dimethylhexanes can be converted to 2,5-dichloro-2,5-dimethylhexane in substantial yield. However, a comparison with the data of Example I shows that when the starting alkane, as here has its alkyl substituents in a non-preferred spacing, more side reactions occur than otherwise would be the case. In the present instance the 2,4- spacing in the feed material resulted in greater amounts of $C_5$-$C_7$ products as well as $C_{10}$ and higher products than was the case when the feed had the 2,5- spacing of methyl groups as in Example I.

EXAMPLE IV

This example illustrates the dichlorination of a doubly branched $C_9$ alkane, viz. 2,6-dimethylheptane (herein "2,6-DMHp"). The reaction was carried out in substantially the same manner as Example III. The starting mixture was composed of 1.00 g. (0.0078 mole) of 2,6-DMHp, 3.29 g. (0.0355) of t-butyl chloride and 4.0 ml. of methylene chloride. The molar ratio of t-butyl chloride to the alkane was about 4.6. The reaction was conducted at 0° C. in two stages, using about 0.03 and 0.05 g. of $AlCl_3$, respectively. Samples were taken after 20 minutes reaction in the first stage (Cut 1) and also after 20 minutes reaction in the second stage (Cut 2). Results are shown in Table IV.

TABLE IV

Reaction of 2,6-Dimethylheptane

|  | Cut 1 | Cut 2 |
|---|---|---|
| Total reaction time, min. | 20 | 40 |
| g. $AlCl_3$/100 g. t-butyl chloride | 0.9 | 2.6 |
| Product Composition, wt. %. |  |  |
| $C_5$ monochlorides | 1.7 | 4.9 |
| $C_6$ monochlorides | trace | 5.3 |
| 2,6-DMHp | 11.6 | 6.1* |
| $C_7$ monochlorides | — | 2.2 |
| $C_8$ monochlorides** | 5.9 | 10.4 |
| 2-chloro-2,6-DMHp | 53.4 | 32.5 |
| 2,5-dichloro-2,5-dimethylhexane | 1.1 | 5.6 |
| $C_{10}$ monochlorides | 0.9 | 6.2 |
| 2,6-dichloro-2,6-DMHp | 23.0 | 22.2 |
| Higher boiling chlorides | 2.4 | 4.6 |
| Ratio of $C_9$ dichloride/$C_9$ monochloride | 0.43 | 0.68 |

*Includes other dimethylheptanes resulting from isomerization.
**Mixture of 2-chloro-2,5-dimethylhexane and other octyl chlorides.

The results of Table IV show that the dimethylheptane feed was converted in substantial amount to 2,6-dichloro-2,6- dimethylheptane by the first AlCl₃ addition and that, under the conditions of this run, the yield of this dichloro compound was not improved by the further addition of AlCl₃. A further increase in this yield could have been obtained, however, by employing a greater amount of t-butyl chloride in the reaction mixture. This C₉ dichloro derivative had a melting point in the neighborhood of 0° C. The data also show that an appreciable amount of the C₈ dichloro product, 2,5-dichloro-2,5-dimethylhexane, was produced, particularly upon addition of AlCl₃ the second time.

EXAMPLE V

This example illustrates the dichlorination of a singly branched C₈ alkane, viz. 3methylheptane (herein "3-MHp"). The reaction mixture was composed of 1.00 g. of 3-MHp, 3.26 g. of t-butyl chloride and 4.0 ml. of methylene chloride, and to this about 0.1 g. of AlCl₃ powder was added. The mixture was stirred at 0° C. for 40 minutes at which time a sample (Cut 1) was taken for analysis, results of which are shown in Table V. The mixture was again stirred at 0° C. for an additional time of 90 minutes without any further addition of AlCl₃ and was then worked up for analysis (Cut 2), but substantially no further reaction resulted.

TABLE V

Reaction of 3-Methylheptane

|  | Cut 1 | Cut 2** |
|---|---|---|
| Total reaction time, min. | 40 | 130 |
| g. AlCl₃/100 g. t-butyl chloride | 3.1 | 3.1 |
| Product Composition, wt. %: |  |  |
| C₅ monochlorides | 9.1 |  |
| 3-MHp | 14.0 |  |
| C₆ monochlorides | 4.7 |  |
| C₇ monochlorides | 8.8 |  |
| dimethylhexyl monochlorides | 1.0 |  |
| methylheptyl monochlorides | 36.3 |  |
| C₉ monochlorides | 5.1 |  |
| methylheptyl dichlorides* | 11.8 |  |
| C₁₀₊ chlorides | 9.3 |  |

*Mixture of at least two dichlorides.
**Substantially same composition as Cut 1.

The data presented in Table V show that substantial dichlorination of singly branched alkanes as herein specified can be effected by means of the present process, in spite of the fact that the starting alkane in this case contains only one tertiary carbon atom.

Analogous results are obtained when other singly and doubly branched alkanes as herein specified are substituted for the starting alkanes used in the foregoing examples. Likewise essentially equivalent results are obtained when tertiary butyl bromide with AlBr₃ as catalyst is used in place of the tertiary chloride. The halogenation reaction also proceeds in essentially the same manner when tertiary amyl chlorides or bromides are used, but in such cases more side reactions tend to occur.

The invention claimed is:

1. The process of preparing dihalogenated alkanes which comprises:
   a. forming a solution of (1) a C₇-C₃₀ branched alkane having a chain of at least six carbon atoms which does not contain a quaternary carbon atom and having 1-2 unbranched alkyl substituents containing 1-3 carbon atoms each, and (2) a C₄-C₅ tertiary alkyl halide in which the halogen is chlorine or bromine in molar ratio to said alkane of at least 2:1, said solution being capable of dissolving and maintaining therein the aluminum trihalide hereinafter specified;
   b. maintaining said solution at a temperature in the range of −30° C. to 20° C. while admixing therewith and dissolving therein an aluminum trihalide in which the halogen is the same as that in said tertiary halide, the weight ratio of aluminum trihalide to the tertiary halide being sufficient to promote dihalogenation of said alkane;
   c. maintaining the resulting solution within said temperature range and in homogeneous phase until at least substantial dihalogenation of said alkane has occurred;
   d. and recovering from the reaction mixture a dihalogenated alkane product.

2. Process according to claim 1 wherein said C₄-C₅ tertiary alkyl halide is tertiary butyl chloride or bromide.

3. Process according to claim 2 wherein said temperature is in the range of −10° C. to 10° C.

4. Process according to claim 3 wherein said weight ratio of aluminum trihalide to the tertiary butyl halide is above 1.5:100.

5. Process according to claim 1 wherein the starting alkane is of the C₇-C₁₀ range and contains 1-2 methyl substituents.

6. Process according to claim 5 wherein the starting alkane contains a single methyl substituent.

7. Process according to claim 6 wherein said C₄-C₅ tertiary alkyl halide is tertiary butyl chloride or bromide, and said weight ratio of aluminum trihalide to the tertiary butyl halide is above 1.5:100.

8. Process according to claim 7 wherein said temperature is in the range of −10° C. to 10° C. and the halogen in the tertiary butyl halide and in the aluminum trihalide is chlorine.

9. Process according to claim 5 wherein the starting alkane contains two methyl substituents.

10. Process according to claim 9 wherein said C₄-C₅ tertiary alkyl halide is tertiary butyl chloride or bromide, and said weight ratio of aluminum trihalide to the tertiary butyl halide is above 1.5:100.

11. Process according to claim 10 wherein said temperature is in the range of −10° C. to 10° C. and the halogen in the tertiary butyl halide and in the aluminum trihalide is chlorine.

12. Process according to claim 11 wherein the starting alkane is a dimethylhexane and product comprising 2,5-dichloro-2,5-dimethylhexane is recovered.

13. Process according to claim 11 wherein the starting alkane is a dimethylheptane and product comprising 2,6-dichloro-2,6-dimethylheptane is recovered.

14. Process according to claim 9 wherein the starting alkane is a dimethylhexane and product comprising 2,5-dihalo-2,5-dimethylhexane is recovered.

15. Process according to claim 9 wherein the starting alkane is a dimethylheptane and product comprising 2,6-dihalo-2,6-dimethylheptane is recovered.

16. Process according to claim 1 wherein the tertiary halide is tertiary butyl chloride, the aluminum trihalide is AlCl₃, and the weight ratio of AlCl₃ to tertiary butyl chloride is above 1.5:100.

17. Process according to claim 16 wherein the starting alkane is of the C₇-C₁₀ range and contains a single methyl substituent.

18. Process according to claim 16 wherein the starting alkane is of the C₇-C₁₀ range and contains two methyl substituents.

19. Process according to claim 18 wherein the starting alkane is a dimethylhexane and product comprising 2,5-dichloro-2,5-dimethylhexane is recovered.

20. Process according to claim 18 wherein the starting alkane is a dimethylheptane and product comprising 2,6-dichloro-2,6-dimethylheptane is recovered.

21. Process according to claim 1 wherein said temperature is in the range of −10° C. to 10° C. and said weight ratio of aluminum trihalide to the tertiary alkyl halide is above 1.5:100 and not in excess of 5:100.

22. Process according to claim 21 wherein the tertiary halide is tertiary butyl bromide and the aluminum trihalide is AlBr₃.

23. Process according to claim 21 wherein the tertiary halide is tertiary butyl chloride and the aluminum trihalide is AlCl₃.

* * * * *